Nov. 16, 1965

KENZO SATO 3,218,109

BEARING HOLDING MECHANISM OF MINIATURE AIR
TURBINES FOR DENTAL HAND PIECES
Filed Nov. 26, 1963

United States Patent Office 3,218,109
Patented Nov. 16, 1965

3,218,109
BEARING HOLDING MECHANISM OF MINIATURE AIR TURBINES FOR DENTAL HAND PIECES
Kenzo Sato, 15 Nabeshima, Moroyama-cho, Fushimi-ku, Kyoto-shi, Japan
Filed Nov. 26, 1963, Ser. No. 326,177
Claims priority, application Japan, Feb. 20, 1959, 34/9,215
1 Claim. (Cl. 308—35)

This invention relates to shaft bearings and related parts of small mechanisms, and is a continuation-in-part application of my application Serial No. 6,652 filed February 4, 1960, now Patent No. 3,134,172 issued May 26, 1964.

More particularly, this invention releates to a mechanism for supporting and holding the bearings of a miniature air turbine for dental hand pieces.

The rotational speeds of drills fitted to dental hand pieces have recently been stepped up at an ever increasing rate, but the operation of cutting at super-high speeds is accompanied by various difficulties. Heretofore, in the conventional mechanisms for this purpose, it has been the usual practice to install the bearings which support the shaft of the rotor by fixing said bearings to metallic parts within the case. However, it has been impossible to eliminate such disagreeable effects as the noise emitted by the bearings and the vibrations caused by the tooth cutting operations, whereby dental patients have been subjected to considerable discomfort. These defects have been the most difficult to overcome in super-high speed dental cutting operations of this type.

It is an essential object of this invention to provide a mechanism wherein the above disadvantages are eliminated, thus completely removing the said discomfort to the dental patient.

It is another object of this invention to provide a mechanism which is simple and compact, yet strong, in construction.

It is still another object of this invention to provide a mechanism which has means for supplying a lubricant to the bearings and means for supplying cooling and flushing water to the cutting tool and tooth being cut.

Figure 1:
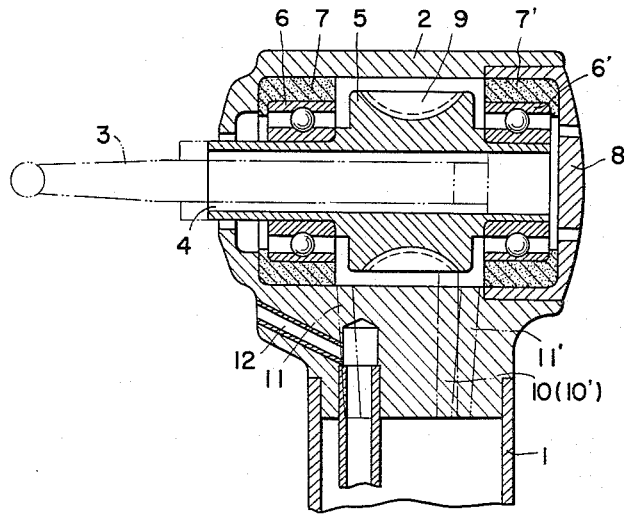
Figure 2:
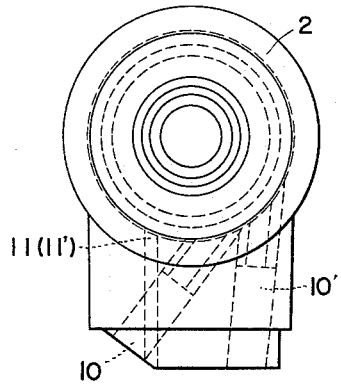
Figure 3:
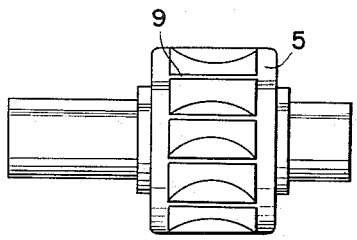

Said objects and other objects, as will be apparent hereinafter, have been achieved by the mechanism of the present invention, the details of which may be best understood by reference to the following detailed description of one embodiment of the invention when taken in connection with the accompanying drawing, in which:

FIGURE 1 is a side elevational view, in section and on an enlarged scale, taken in a plane through the center lines of the rotor piece, of one embodiment of the mechanism of the invention, FIGURE 2 is an elevational front view of the mechanism of FIGURE 1, and FIGURE 3 is a plan view of the rotor of the embodiment of FIGURES 1 and 2.

Referring now to the drawing, a casing or housing 2 for the mechanism is fixed to the tube-shaped neck portion 1 of a dental hand piece (only part of which is shown). Within said casing 2 a rotor 5 into which is inserted a part such as an elastic chuck 4 for holding a tool 3, such as a diamond bar, is supported rotatably by miniature bearings 6 and 6'. One of the bearings, 6, is held elastically in the casing 2 by an elastic collar 7 formed from hard rubber, and the other bearing, 6', is held by a similar collar 7' which is held fixedly in the casing 2 by a cap screw 8.

The rotor 5 consists of a waisted, spool-shaped body and a plurality of blades 9, said blades being of semicircular or similar shape and with smooth surfaces, embedded at suitable angles in said body at its concave portion, as is clearly shown in FIGURE 3. Compressed air is injected tangentially to the rotor surface through nozzles 10 and 10' provided in the casing 2 at one side of the blades 9, and exhausted from the other side of said blades to cause the rotor 5 to rotate.

The miniature bearings 6 and 6' are lubricated by oil injected in spray form thereto from lubrication nozzles 11 and 11' by compressed air.

There is slight clearance between the collar 7 and casing 2 and the collar 7' and cap screw 8, whereby oil from nozzles 11 and 11' to lubricate bearings 6 and 6' also forms an oil film between cap screw 8, casing 2 and collars 7' and 7 respectively. Formation of the oil film between the elements, as described above, allows some rotatory movement of collars 7 and 7' whereby the collars carry out a cushioning function.

For cooling and flushing the cutting tool, as well as the teeth being operated upon during the dental cutting operation, a cooling water pipe 12 is disposed within the neck portion 1 for ejecting cold water.

Since the mechanism of this invention is of the foregoing construction wherein the miniature bearings 6 and 6' supporting the shaft of the rotor 5 are in turn held to the casing 2 elastically through collars 7 and 7' formed from elastic, hard rubber, the metallic noise which would otherwise be emitted from the miniature bearings 6 and 6' by the high-speed rotation of the rotor 5 is effectively prevented. Furthermore, the vibrations occurring during the tooth cutting operation are absorbed.

It will be obvious to those skilled in the art that various changes may be made in the invention without departing from the spirit and scope thereof and therefore the invention is not limited by that which is shown in the drawings and described in the specification, but only as indicated in the appended claim.

What is claimed is:

An air turbine operated dental tool device comprising an air turbine rotor with a shaft portion, a casing with opposing end covers, one of which being a cap screw which is fitted with said casing, bearing members for supporting said rotor in said casing, at least two resilient cylindrical rubber collars mounted in spaced relation in said casing, said collars being respectively fitted with said casing and cap screw so that very slight clearance adapted to form an oil film is formed at the said fitting surfaces so as to enable said collars to rotate lightly in the inner surfaces of said casing and cap screw, and each of said collars supporting one of said bearing members therein, said rubber collars each having resilient side flanges adapted to separate said bearing members from said end cover of said casing and cap screw, and the shaft of said rotor being mounted to said bearing members in a manner that the resilient collars may absorb the vibration produced by the rotation of the rotor and shaft.

References Cited by the Examiner
UNITED STATES PATENTS
2,872,254   2/1959   McMaughton et al. _____ 308—35

FOREIGN PATENTS
496,282   2/1937   Great Britain.

DON A. WAITE, Primary Examiner.
FRANK SUSKO, Examiner.